US012723996B1

(12) United States Patent
Kancharla et al.

(10) Patent No.: US 12,723,996 B1
(45) Date of Patent: Sep. 1, 2026

(54) AUTOMATED THERMAL CONDUCTIVITY TESTER

(71) Applicant: ARoboticsCompany, Inc, Ossining, NY (US)

(72) Inventors: Akaash Reddy Kancharla, Ossining, NY (US); Jack Norleans, Ossining, NY (US); John Gray Levitsky, Ossining, NY (US)

(73) Assignee: AROBOTICSCOMPANY, INC, Ossining, NY (US)

( * ) Notice: Subject to any disclaimer, the term of this patent is extended or adjusted under 35 U.S.C. 154(b) by 0 days.

(21) Appl. No.: 19/550,645

(22) Filed: Feb. 26, 2026

(51) Int. Cl.
*G01N 25/58* (2006.01)
*G01N 25/18* (2006.01)

(52) U.S. Cl.
CPC ............ *G01N 25/58* (2013.01); *G01N 25/18* (2013.01)

(58) Field of Classification Search
CPC ............................... G01N 25/58; G01N 25/18
USPC ....................................................... 73/863.11
See application file for complete search history.

(56) References Cited

U.S. PATENT DOCUMENTS 8,826,564 B2 * 9/2014 He .......................... F25B 21/02 34/558
10,309,722 B1 * 6/2019 Troxler .................. F26B 9/066
2004/0255483 A1 * 12/2004 Ely ...................... F26B 21/331 34/60
2013/0326900 A1 * 12/2013 James .................... F26B 5/048 34/245
2021/0207886 A1 * 7/2021 Parker .................... F26B 17/04

* cited by examiner

*Primary Examiner* — Marrit Eyassu
(74) *Attorney, Agent, or Firm* — Buckley, Maschoff & Talwalkar LLC

(57) ABSTRACT

A system may include a test chamber with an area to hold a sample of material (e.g., concrete, thermal backfill, or sand). The area may be subject to a variable desaturation vacuum to dry the sample. The test chamber may also have a precision scale to weigh the sample and a probe inside the sample to provide heat and measure temperature. A controller may automatically and repeatedly dry the sample by varying the desaturation vacuum. According to some embodiments, heat inside and/our outside the sample may also be applied to facilitate desaturation. The controller calculates a thermal resistivity based on heat input, temperature, and time data collected for different saturation levels. A test result data store may contain electronic records (with each record including thermal resistivity values over a range of moisture content values that represent a dryout curve for the material).

17 Claims, 20 Drawing Sheets

START TEST

END TEST

1620

| Moisture Content (% dry wt) | Automated Tester Thermal Resistivity (° K*cm/W) | Comparison Lab Thermal Resistivity (° K*cm/W) | % Difference Between Test Results |
|---|---|---|---|
| 2.0 | 61.58 | 60.0 | 2.63% |
| 0.0 | 79.22 | 84.0 | 5.69% |

1720

| Moisture Content (% dry wt) | Automated Tester Thermal Resistivity (° K*cm/W) | Comparison Lab Thermal Resistivity (° K*cm/W) | % Difference Between Test Results |
|---|---|---|---|
| 3.0 | 59.49 | 56.62 | 5.07% |
| 0.0 | 102.11 | 104.63 | 2.41% |

1900

| TEST IDENTIFIER 1902 | PROJECT NAME 1904 | DATE (TIME) 1906 | MOISTURE CONTENT 1908 | THERMAL RESISTIVITY 1910 |
|---|---|---|---|---|
| T_1001 | FLUIDIZED THERMAL BACKFILL | 7/19/2028 (06:42.40) | 0 | 102.11 |
| T_1002 | FLUIDIZED THERMAL BACKFILL | 7/19/2028 (08:35.28) | 1 | 85.28 |
| T_1003 | FLUIDIZED THERMAL BACKFILL | 7/19/2028 (08:28.32) | 2 | 67.04 |

*FIG. 19*

AUTOMATED THERMAL CONDUCTIVITY TESTER

TECHNICAL FIELD

Some embodiments are directed to thermal conductivity testing. In particular, embodiments disclose automated systems (e.g., that utilize vacuum drying) to perform thermal conductivity testing of a sample.

BACKGROUND

In many industries, such as the utilities sector, construction materials serve as safety-critical heat sinks for large, temperature sensitive components such as buried transmission lines, steam piping, cryogenic Liquefied Natural Gas ("LNG") storage tanks, etc. The material (e.g., such as concrete, sand, or soil) surrounding these elements is itself a major component of insulation or heat dissipation systems for large utilities infrastructure. Because heat flux is a major design consideration for new utilities installations, there is substantial need to verify the thermal resistivity as well as mechanical strength of as-built materials during construction.

Note that the thermal "conductivity" of a material (K) is a measure of its ability to conduct heat. It quantifies the proportionality between the heat flux and the temperature gradient in the direction of heat transport. Materials with high thermal conductivity transfer heat more efficiently than those with low thermal conductivity. The reciprocal of thermal conductivity is called thermal "resistivity" and, a result, measuring or calculating thermal conductivity also measures resistivity.

Relevant testing standards for thermal resistivity testing for soil, sand, rock, and concrete include the Institute of Electrical and Electronics Engineers ("IEEE") 442-2017 standard and the American Society for Testing and Materials ("ASTM") D5334-22AE01 standard which use the transient line source method. These tests offer highly repeatable, precise thermal resistivity values for heterogeneous materials such as concrete (with aggregate exceeding 1 inch in size) and are the gold standard for verifying thermal conductivity/resistivity of construction materials.

Moisture content significantly impacts thermal resistivity. Nearly all construction materials are exposed to precipitation and groundwater and undergo significant changes in moisture throughout their lifespan. To account for this, engineers often require thermal resistivity tests to be carried out at different moisture content levels to obtain a thermal dryout curve. The dryout curve describes the relationship between the material's thermal resistivity and its moisture content at levels ranging from complete dryness up to a significant degree of saturation.

The need to test at varying moisture content greatly complicates the testing procedure. A large number of processing steps are needed to determine sample moisture content at each thermal resistivity test point. These steps introduce compounding measurement error risk and limit the turnaround time for test results to the point where the test can be a bottleneck for construction work.

For example, FIG. 1 shows a typical thermal conductivity test approach 100. After preparing a sample of material 110, conventional test procedures rely on oven heating 120 to dry out saturated samples with manual thermal resistivity measurements 140 taken intermittently during the baking process. Due to the poor diffusivity of moisture in many construction materials, samples often require more than 7 days of oven time to become fully dry. On top of the long oven time requirement, every time the sample is removed from the oven, it often takes many hours for it to cool 130 from oven conditions (e.g., over 100° C.) to stable room temperature. This severely limits the sampling density along the dryout curve and can add days to the test schedule.

A need exists for improved systems and methods to facilitate thermal conductivity testing of a material.

SUMMARY

According to some embodiments, a test chamber includes an area to hold a sample of material (e.g., concrete, thermal backfill, or sand). The area may be subject to a variable desaturation vacuum to dry the sample. The test chamber may also have a precision scale to weigh the sample and a probe inside the sample to provide heat and measure temperature. A controller may automatically and repeatedly dry the sample by varying the desaturation vacuum. The controller may also calculate a thermal resistivity based on heat input, temperature, and time data collected for different saturation levels. A test result data store may contain electronic records (with each record including thermal resistivity values over a range of moisture content values that represent a dryout curve for the material).

Some embodiments comprise: means for placing a sample of material into an area of a test chamber, wherein the area is subject to a variable desaturation vacuum to dry the sample; means for weighing the sample with a precision scale in the test chamber; means for placing a probe proximate to the sample to provide heat and measure temperature; means for automatically and repeatedly, by a controller, drying the sample by varying the desaturation vacuum; means for automatically and repeatedly calculating, by the controller, a thermal resistivity based on heat input. Temperature, and time data collected for different saturation levels; and means for storing results of the calculation in a test result data store containing electronic records, each record including thermal resistivity values over a range of moisture content values that represent a dryout curve for the material.

Some technical advantages of some embodiments disclosed herein are improved systems and methods to facilitate thermal conductivity testing of a material.

BRIEF DESCRIPTION OF THE DRAWINGS

FIG. 19 is a test result database according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
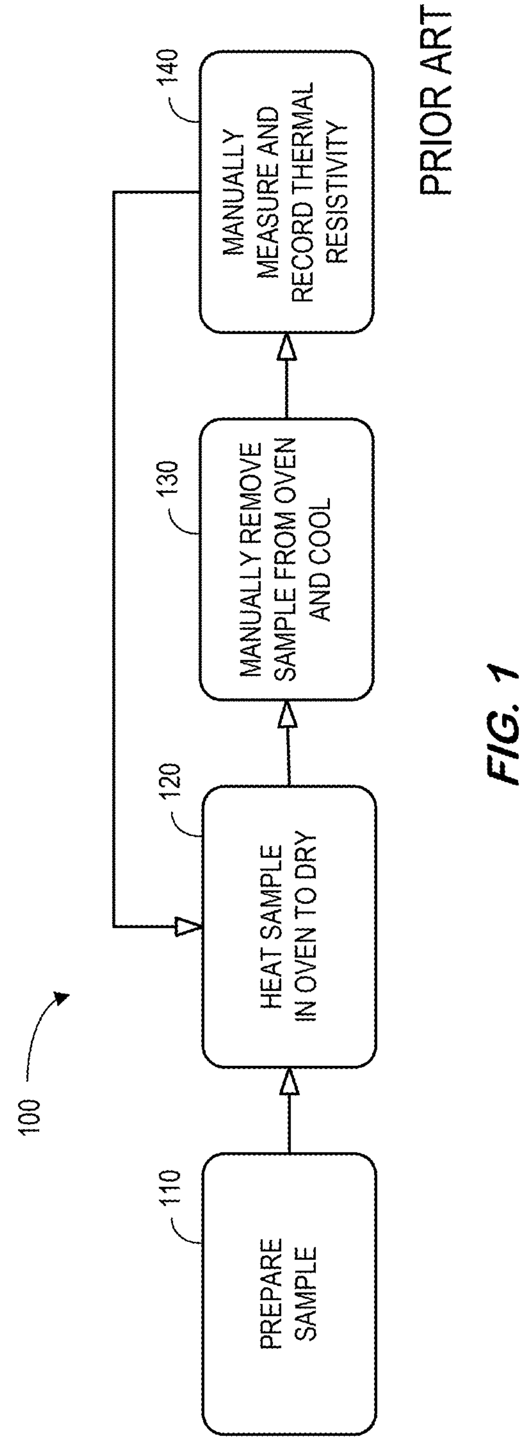
FIG. 1 is a typical thermal conductivity test approach.
Figure 2:
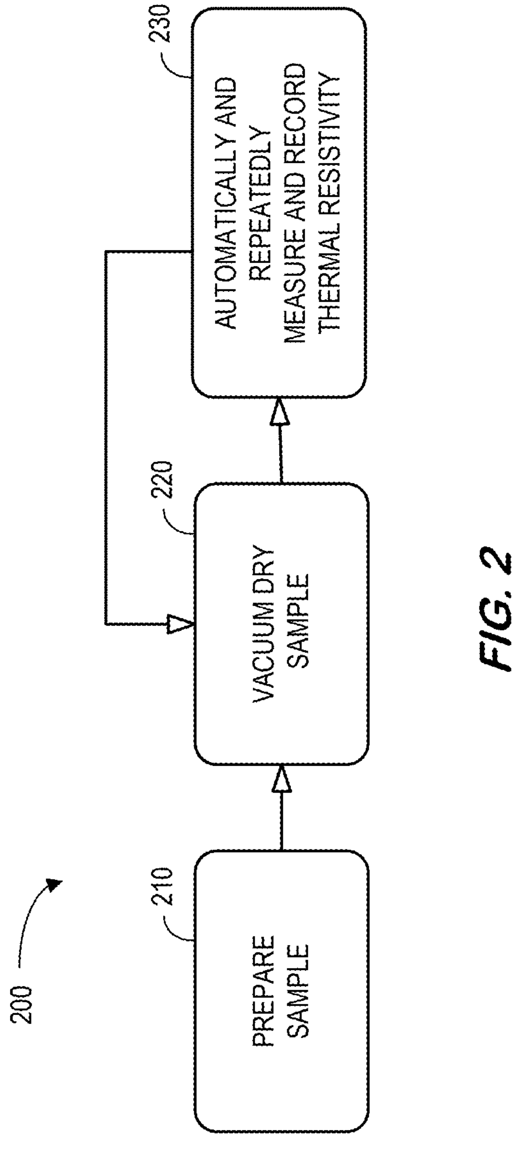
FIG. 2 is a thermal conductivity test approach according to some embodiments.

FIG. 2 is a thermal conductivity test approach 200 according to some embodiments. According to some embodiments described herein, after preparing a sample of material 210 the system may use a vacuum chamber to dry the sample 220 (one or more heating elements may also help the drying process). The system automatically and repeatedly monitors the thermal conductivity of the sample 230 throughout the course of drying. Tests may be conducted to IEEE 442-2017, ASTM D5334-22AE01, or another professional standard. The system may automate the process of weighing the sample and measuring thermal conductivity at different saturation levels while automatically calculating resistivity using the collected temperature/time data.

Figure 3:
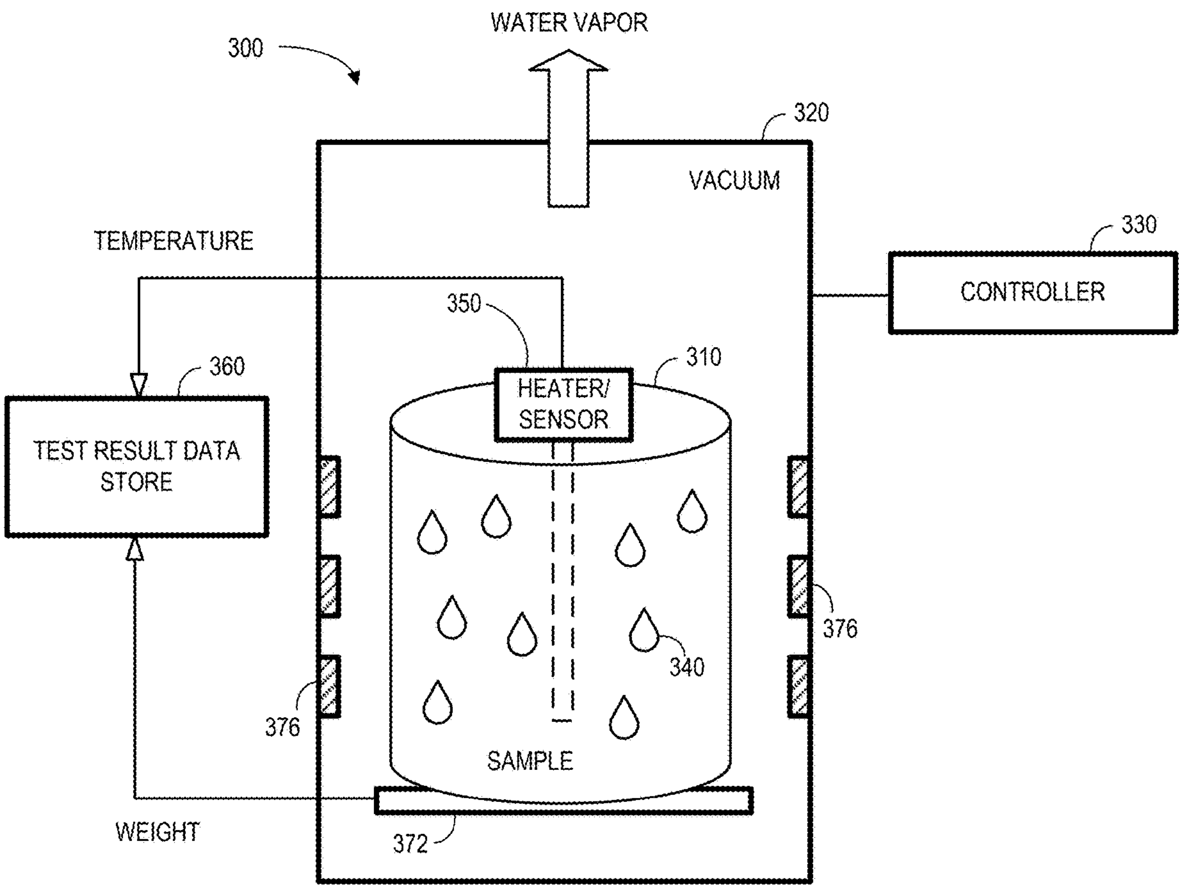
FIG. 3 is a high-level diagram of a thermal conductivity test system in accordance with some embodiments.

FIG. 3 is an IEEE 422-2017 and ASTM D5334-22AE01 compliant automated thermal resistivity (or conductivity) testing system 300 according to some embodiments. The system 300 may obtain full dryout curves with no human intervention and less than half the turnaround time of current testing methods. The automated thermal dryout system 300 controls and measures the test sample's moisture content and measures thermal resistivity without operator intervention. The automated approach offers significant benefits for contractors and engineers. The automated nature of this test reduces the risk of measurement error and offers an unprecedented level of traceability for each data point. The automated sample drying process also reduces the turnaround time for each test by over 60% for most common materials, delivering timely validation of thermal resistivity for various construction stakeholders.

A saturated sample 310 in a vacuum 320 managed by a controller 330 will "sweat" out moisture beads 340 in the early stages of dryout. The beads 340 evaporate and the water vaper is removed by the vacuum pump. In this way, the system 300 may accelerate the test schedule by using the vacuum 320 to dry the sample 310. Because the sample 310 is not heated to oven temperatures, there is no hours-long cool down period between resistivity tests. The vacuum method reduces the boiling point of water throughout the sample 310 and accelerates the evacuation of water vapor from the sample's pores. A heater/sensor probe 350 and heat rings 376 may help the drying process. The automated test system 300 may frequently monitor the moisture content in the sample 310 (based on weight measurements by a precision scale 372) and take readings throughout the dryout process. The automated process may use the heater/sensor probe 350 to alternately: (1) introduce thermal energy into the sample 310, and (2) act as a thermometer to take temperature readings and generates precise thermal resistivity data (based on the heat traveling through the sample 310) at each moisture point which is stored in a test result data store 360. Due to the rapid pace of vacuum dryout, the automated system 300 is able to sample thermal resistivity at a large number of moisture content levels throughout the test. This significantly enhances test accuracy by minimizing the risk of artifacts or test irregularities interfering with the shape of the final reported dryout curve. The sample 310 may be handled entirely by the automated testing system 300 during the test. This may reduce errors from human handling of the test sample 310 and the risk of air bubble formation associated with any reinsertions of a line source probe. Automated sample 310 handling may also lead to consistent scale readings, reducing measurement error in weight readings to less than 0.1%. These de-risking measures (combined with high sampling density) made possible by the automated testing system 300 may lead to improved repeatability.

Comprehensive heater/sensor probe 350 connectivity in the automated testing system 300 also allows for the execution of data analysis on thousands of temperature readings per test while maintaining compliance with IEEE 442-2017 standards. The testing system's data analysis software may filter data for thermal resistivity calculations with improved accuracy and speed as compared to a manual data analysis workflow and reduce data entry steps. Embodiments may incorporate a built-in function to flag anomalous test results so that they can be inspected by an on-staff expert, further reducing the risk of error.

As used herein, devices, including those associated with the system 300 and any other device described herein, may exchange information via any communication network which may be one or more of a hard-wired network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The system 300 may store information into and/or retrieve information from various data stores (e.g., the test result data store 360), which may be locally stored or reside away from the controller 330. Although a controller 330 is shown in FIG. 3, any number of such devices may be included. Moreover, various devices described herein might be combined according to embodiments of the present invention. For example, in some embodiments, the controller 330 and the test result data store 30 might comprise a single apparatus. Any of the system 300 functions may be performed by a constellation of networked apparatuses, such as in a distributed processing or cloud-based architecture.

Figure 4:
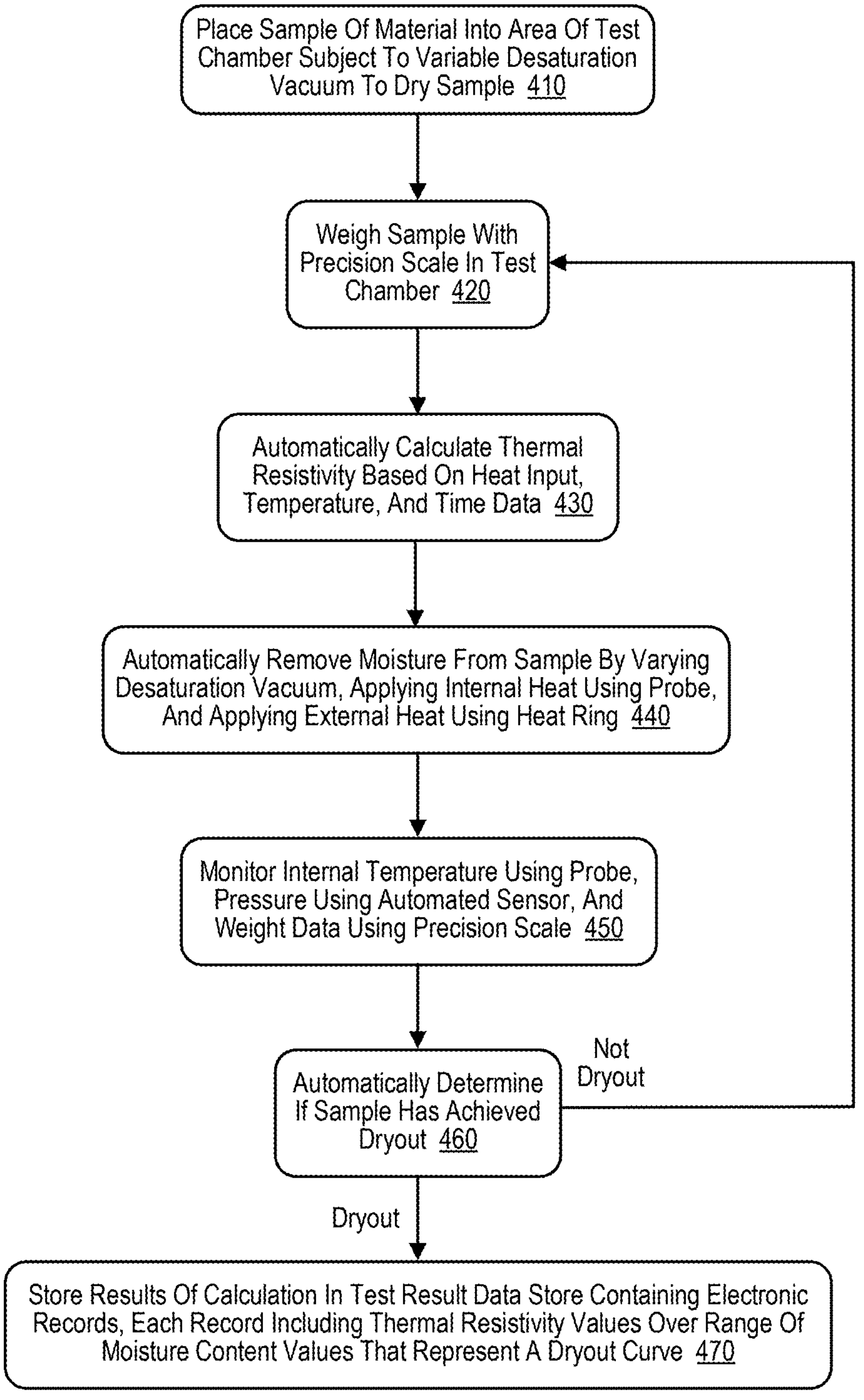
FIG. 4 is a thermal conductivity test method according to some embodiments.

FIG. 4 illustrates a remote surface monitoring method that might be performed in connection with some or all of the elements of the system 300 described herein in connection with FIG. 3 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 410, a sample of material may be placed into an area of a test chamber, and the area may be subject to a variable desaturation vacuum to dry the sample. At 420, the sample is weighed with a precision scale in the test chamber. Thermal resistivity is automatically calculated using the probe at S430 based on heat input, temperature, and time data at 430. As used herein, the term "automatically" may refer to, for example, actions that can be performed with little or no human intervention. At 440, moisture is automatically removed from sample by varying desaturation vacuum (an internal heat may be applied to the sample using the probe and/or external heat may be applied using a heat ring). At 450, internal temperature data is monitored using the probe, pressure using an automated sensor, and weight data using the precision scale. At 460, the system automatically determines if dryout of the sample was achieved using collected weight data (e.g., when the weight of the sample has not changed by at least a predetermined amount). If not, the process continues at 420. When dryout is achieved, results are stored at 470 in a test result data store that contains electronic records (each record including thermal resistivity values over a range of moisture content values that represent a dryout curve).

Figure 5:
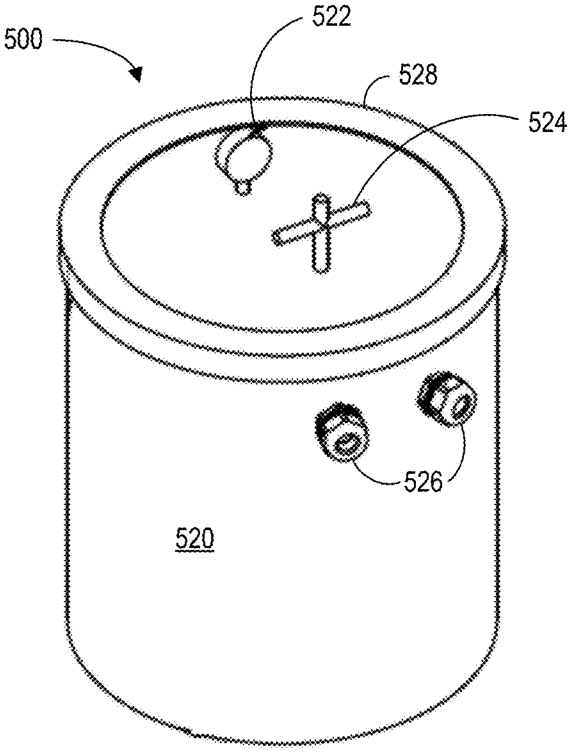
FIG. 5 is a perspective view of a thermal conductivity test apparatus in accordance with some embodiments.
Figure 6:
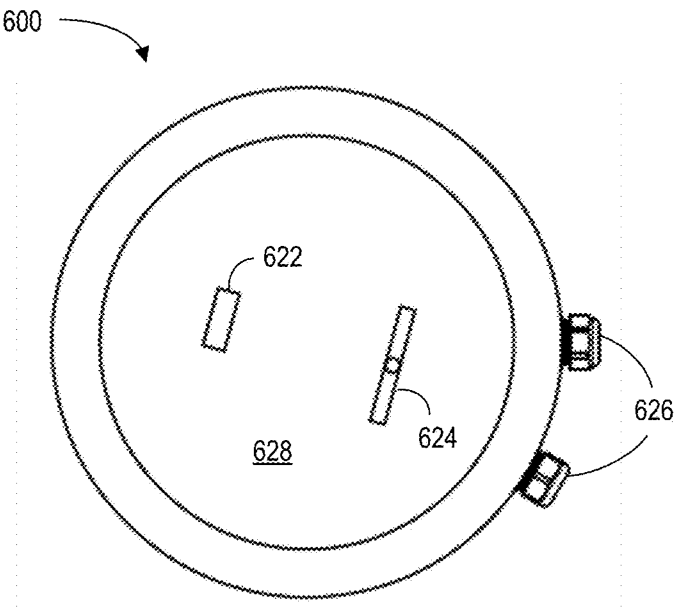
FIG. 6 is a top view of a thermal conductivity test apparatus according to some embodiments.

FIG. 5 is a perspective view of a thermal conductivity test apparatus 500 in accordance with some embodiments. A test chamber 520 may have a pressure gauge 522 (e.g., an analog and/or a digital Pound per Square Inch ("PSI") gauge), a vacuum port/air intake with solenoid valves 524, electronics pass throughs 526 (e.g. to let power and measurement wires into and/or out of the apparatus 500), and a test chamber lid 528. The test chamber 520 may comprise a customized vacuum chamber provided for desaturation/testing using, for example, a ROCKER™ 911 oil-free vacuum pump. FIG. 6 is a top view of a thermal conductivity test apparatus 600 according to some embodiments. A pressure gauge 622 and vacuum port/air intake with solenoid valves 624 may be located on a test chamber lid 628. Moreover, electronics pass throughs 626 may be provided on the side of the apparatus 500.

Figure 7:
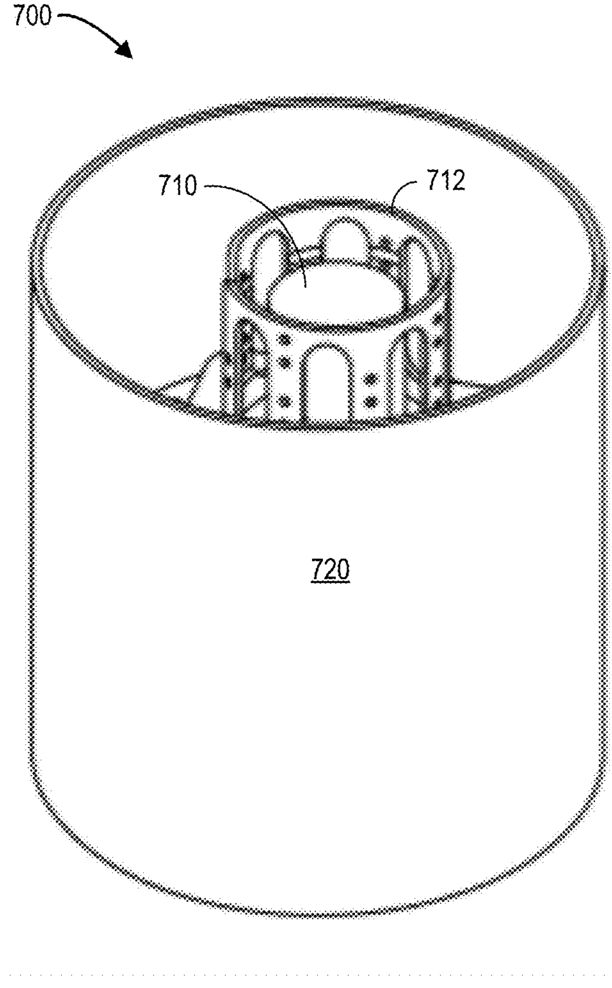
FIG. 7 is a perspective view of a test chamber with the lid removed in accordance with some embodiments.
Figure 8:
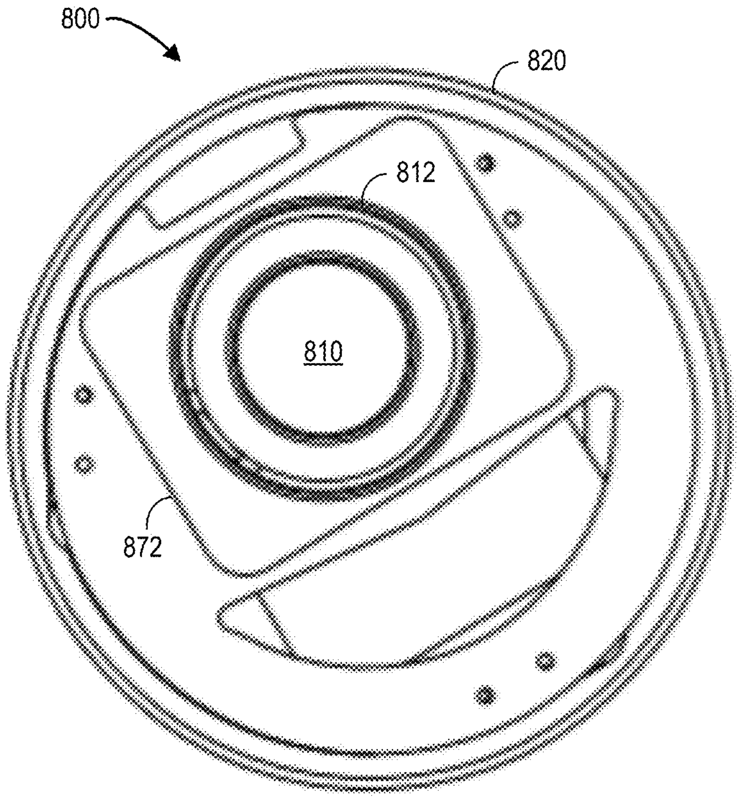
FIG. 8 is a top view of a test chamber with the lid removed according to some embodiments.

FIG. 7 is a perspective view of a test chamber 700 with the lid removed in accordance with some embodiments. A sample 710 is located inside of a sample holder 712 (e.g., a 3D printed holder) within the test chamber 720. FIG. 8 is a top view of a test chamber 800 with the lid removed according to some embodiments. As before, sample 810 sits inside a sample holder 812 within a test chamber 820. The sample 810 may sit on a precision scale 872, such as a TREE™ TSC-10001 high resolution touch screen top loader balance.

Figure 9:
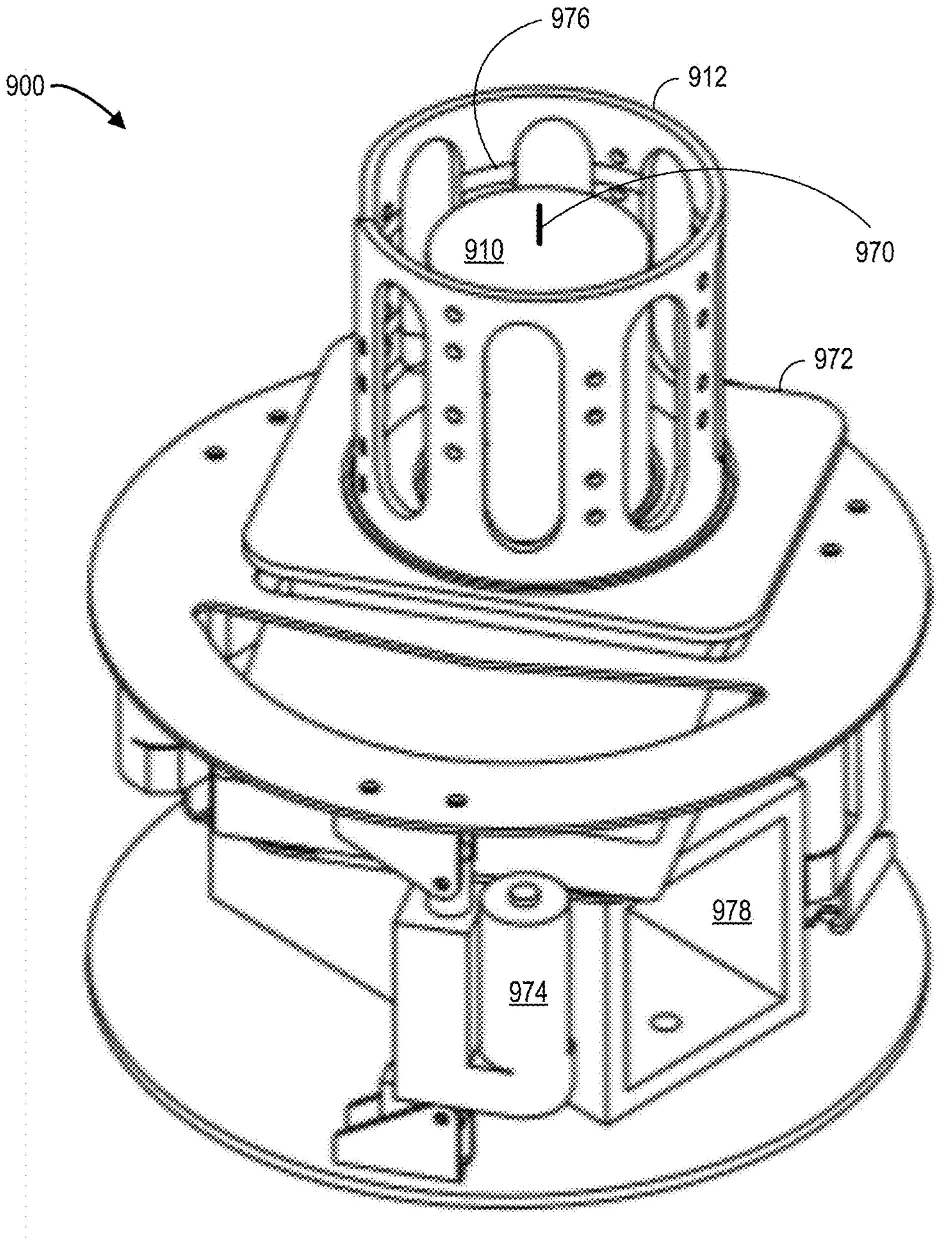
FIG. 9 is a perspective view of the internal components of a test chamber in accordance with some embodiments.

FIG. 9 is a perspective view of the internal components of a test chamber 900 in accordance with some embodiments. A sample 910 is placed within a sample holder 912 and has an inserted thermocouple and heating element 970. The sample 910 sits on a precision scale 972 and may be raised and lowered via pistons 974. Note that the precision scale 972 may automatically incorporate a filter associated with hysteresis. Consider, for example, a sample that is measured as weighing 2000 grams. If a subsequent reading measures 1999 grams, the scale 972 may continue to output 2000 grams (based on an assumption that the same object is still being weighed). This can introduce errors into the thermal conductivity calculations. To avoid this, the pistons 974 may automatically raise the sample off of the scale 972 and then lower the sample back onto the scale 972 between measurements (and the scale 972 now assumes that a different object is being weighed).

Figure 10:
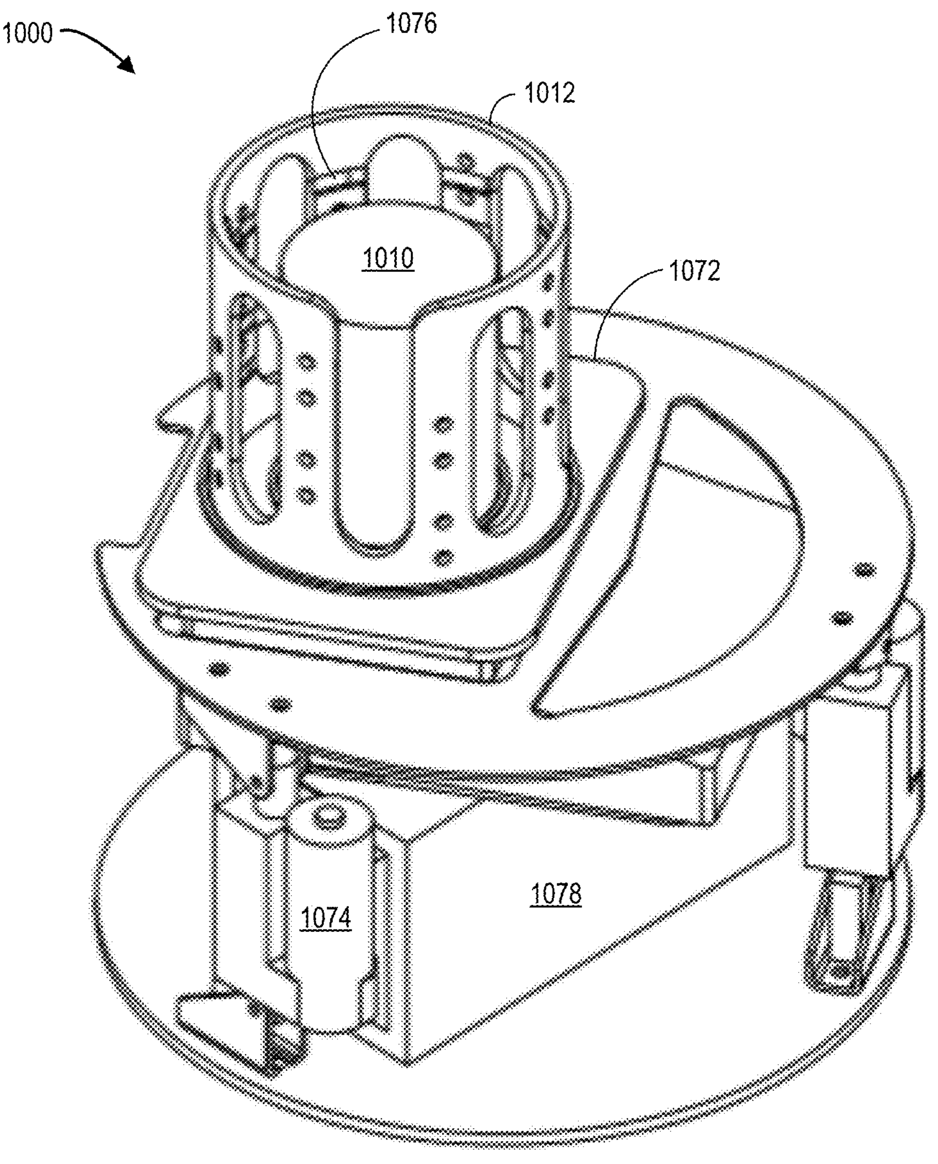
FIG. 10 is another perspective view of the internal components of a test chamber according to some embodiments.

Heating rings 976 may be provided on within the sample holder 912 proximate to the sample 910 to facilitate evaporation. Moreover, a raised platform 978 may separate the sample from a base of the chamber 900. FIG. 10 is another perspective view of the internal components 1000 of a test chamber according to some embodiments. As before, a sample 1010 is placed within a sample holder 1012 and has an inserted thermocouple and heating element 1070. The sample 1010 sits on a precision scale 1072 and may be raised and lowered via pistons 1074. Heating rings 1076 may be provided on the sample holder 1012 proximate to the sample 1010 to facilitate evaporation. Moreover, a raised platform 1078 may separate the sample from a base of the chamber 1000.

Figure 11:
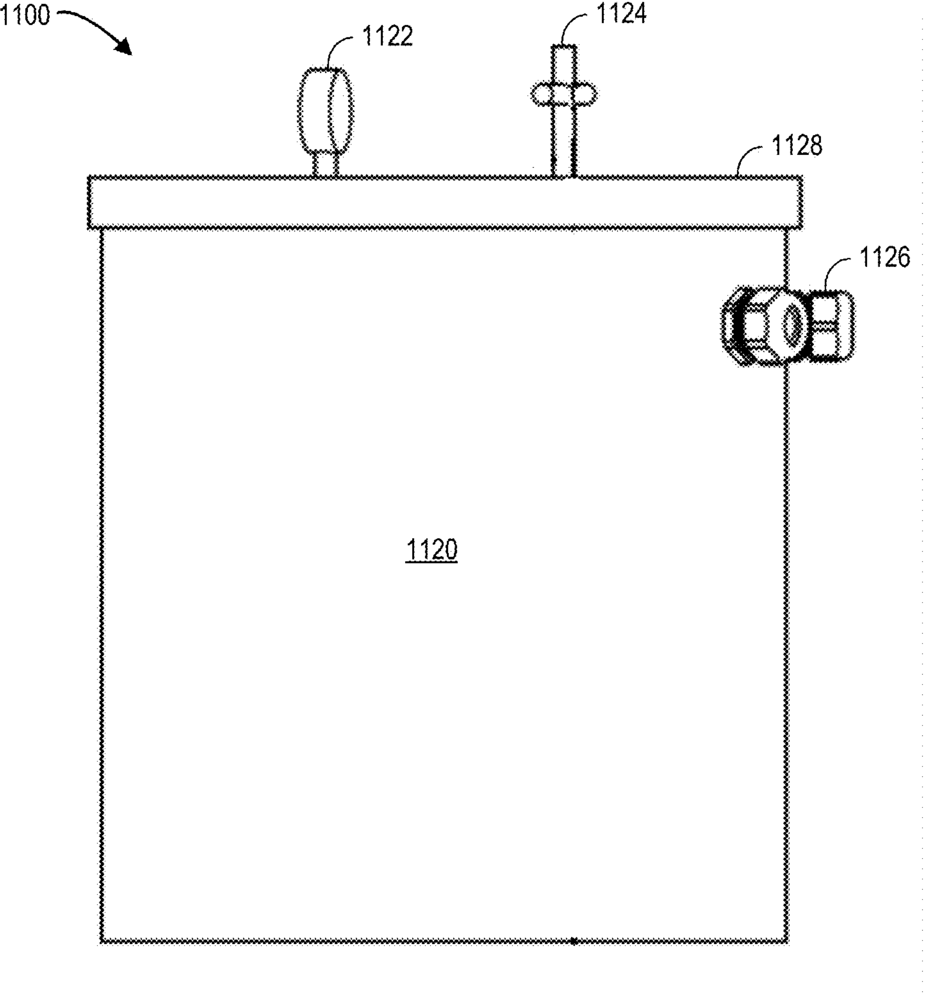
FIG. 11 is a side view of an apparatus in accordance with some embodiments.
Figure 12:
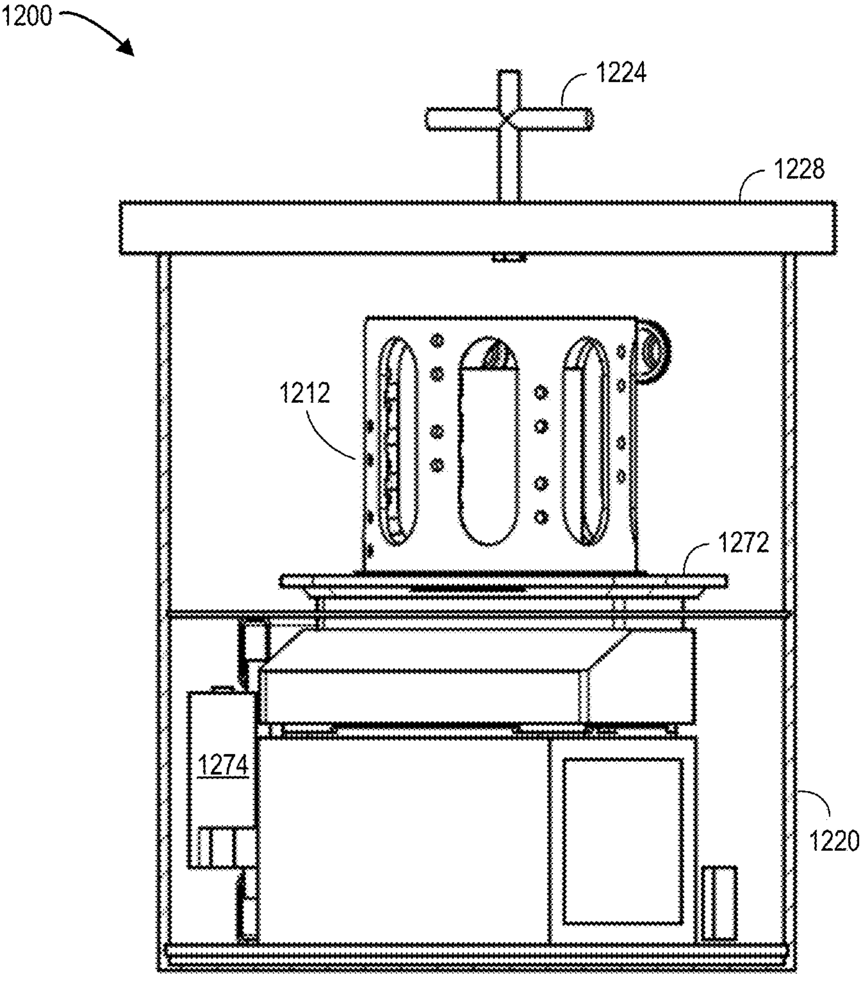
FIG. 12 is a cutaway view of an apparatus according to some embodiments.

FIG. 11 is a side view of an apparatus 1100 in accordance with some embodiments. A test chamber 1120 has a pressure gauge 1122, a vacuum port/air intake with solenoid valves 1124, electronics pass throughs 1126, and a test chamber lid 1128. FIG. 12 is a cutaway view of an apparatus 1200 according to some embodiments. A sample holder 1212 sits on a test chamber 1220 having a vacuum port/air intake with solenoid valves 1224 on a test chamber lid 1228. A sample sits on a precision scale 1272 and be raised or lowered via pistons 1274.

Figure 13:
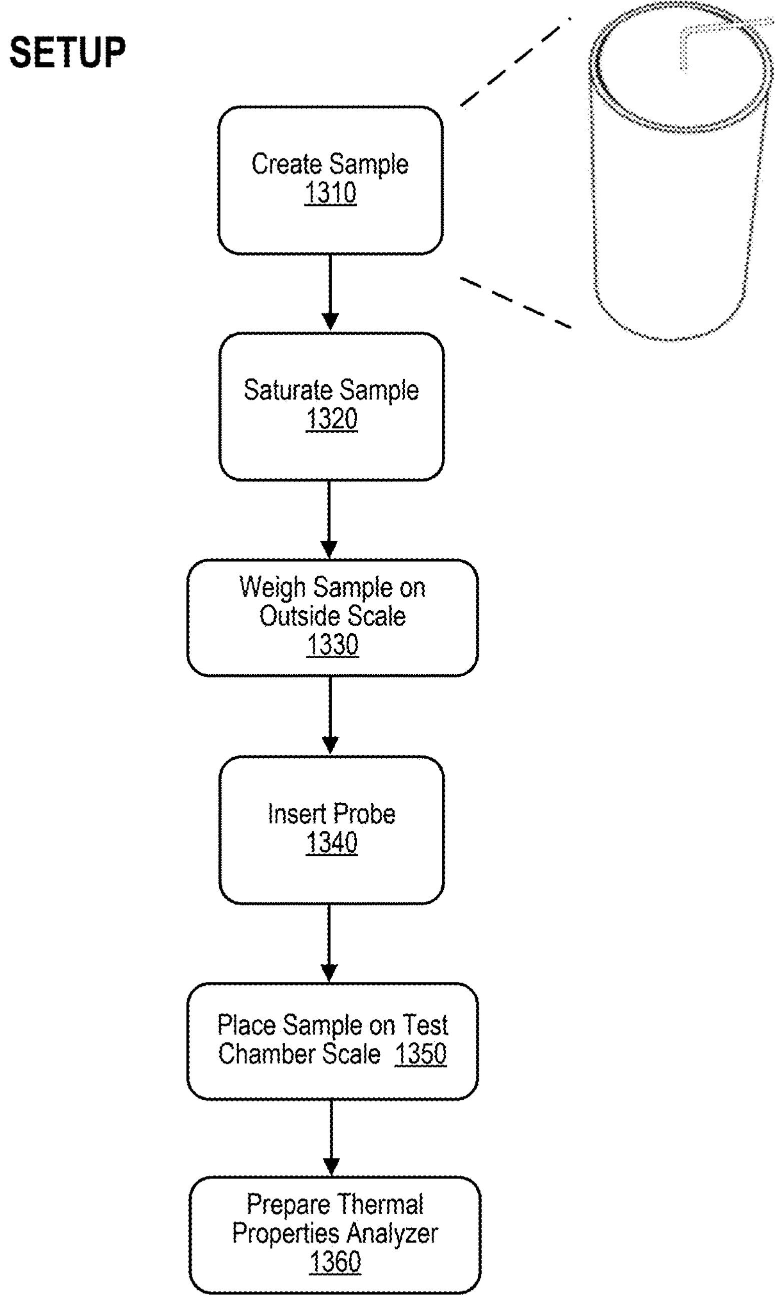
FIG. 13 is a setup method in accordance with some embodiments.

FIG. 13 is a test setup method in accordance with some embodiments. At 1310, a sample is created. A cylindrical tube (e.g., machined out of aluminum) into which material (e.g., concrete) is poured might have, for example, a 4" diameter and 8" length. Moreover, a pilot pin may be installed into the top of the material to let a sensor probe needle later be inserted into, for example, cured cement without damage to the needle or cement. The pilot pin might have, for example, a 2.5 mm diameter and a 125 mm length. The pilot pin may be coated with petroleum jelly to allow for easy removal after curing and be inserted 100 mm to 105 mm into the wet cement. The pilot pin may be centered in the sample and be as vertically aligned as possible.

After the sample is cured, the pilot pin is removed. At 1320, the sample is saturated by placing sample in vacuum chamber ⅔ full of water. The chamber may then be sealed and the vacuum may be activated. After a predetermined period of time (e.g., 2 hours for a smaller sample), it is removed from the chamber. The surface area of the sample may be sprayed with compressed air to remove surface moisture (ensuring that there are no visible droplets on the surface and that the probe hole in particular is dry) and the sample may be weighed on an outside scale at 1330.

Once an initial weight has been recorded, the hole in the sample may be fully filled with thermal grease, and a probe is inserted at 1340. The probe may be inserted fully (and the test may be aborted when an excessive amount of force is required for insertion). The probe may be held in place (e.g., for 4 minutes) while the paste hardens.

Figure 14:
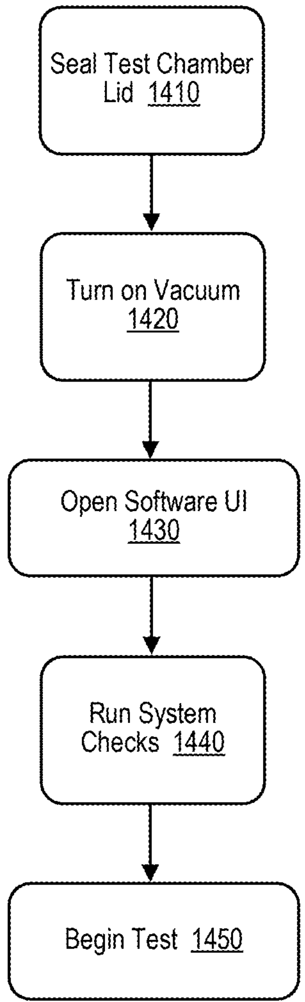
FIG. 14 is a start test method according to some embodiments.

At 1350, the sample is placed on the test chamber scale and the precision scale may be prepared. This may involve placing the scale in the center of the desaturation vacuum, turning it on, ensuring that the date and time shown are accurate. The scale settings may be verified (e.g., units of measurement, sensor type, power level, read time, etc.). The probe may be plugged into a port in the chamber and the chamber lid may be sealed. On a connected computer's User Interface ("UI"), the test may be customized to adhere to a user's specific needs (ASTM/IEEE, concrete/thermal back-fill, etc.). At 1360, a thermal properties analyzer may be prepared FIG. 14 is a start test method according to some embodiments. The test chamber vacuum may be created by placing the output valve to shut at 1410. At 1420, the output valve is turned to shut and the vacuum pump is turned on at 1430. At 1440, it may be ensured that the vacuum gauge is increasing. If not, the chamber lid may be checked for potential leak points. At 1450, the thermal properties analyzer may be started by selecting "unattended" mode. In addition, appropriate values for readings and an interval may be selected. After the vacuum reaches −29 in hg, the analyzer may be started, the test may be named, and the test may be begun.

There is no longer a need to manually change valves or check the vacuum gauge. The system is outfitted with solenoid valves to allow vacuum in or out and a pressure sensor to ensure the vacuum operates as expected (and throw an alarm for a supervisor to see if not). There is no need to mention the thermal properties analyzer anymore. Once the initial test setup has been done, the system should be fully automated barring unexpected errors.

Figure 15:
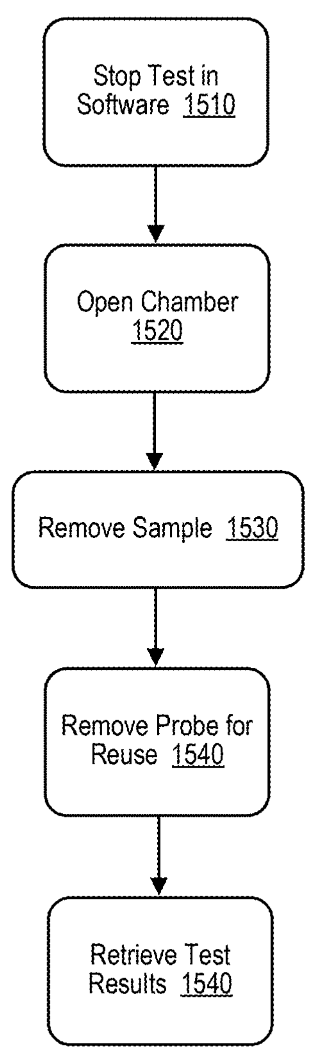
FIG. 15 is an end test method in accordance with some embodiments.

FIG. 15 is an end test method in accordance with some embodiments. The test chamber vacuum may be stopped by turning the input valve to shut at 1510. At 1520, the vacuum pump is turned off. The output valve is turned to open at 1530. The system may then be disconnected and the probe may be removed. At 1540, results are retrieved (e.g., from a test result data store), and the test chamber may be cleaned for subsequent use.

Test end has also been simplified. The system automatically detects when the sample has stopped losing moisture and will throw an alert to the supervisor so that they can end the test by simply hitting "Stop" on the user interface. Then they just need to remove the sample from the system, clean off the probe, and give the results a sanity check before signing off on them.

Figure 16:
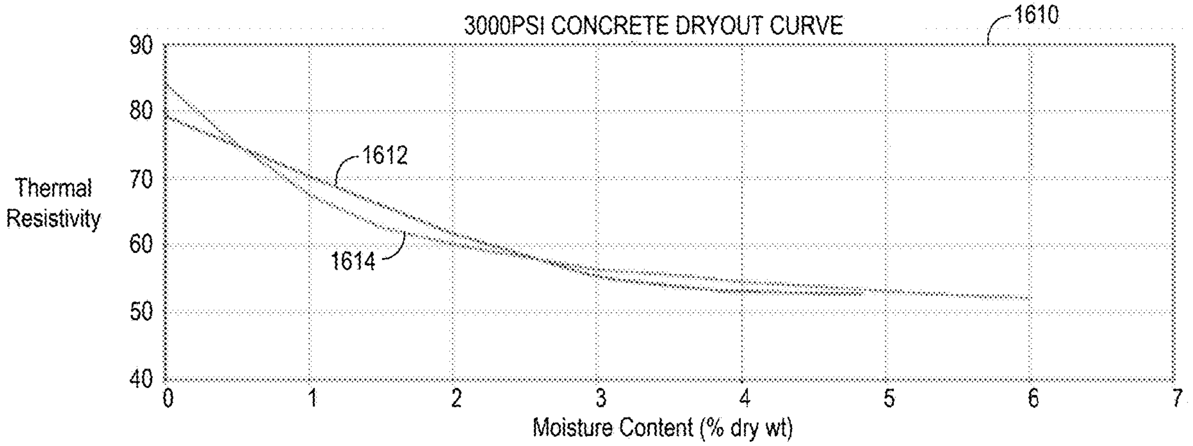
FIGS. 16 and 17 are test results according to some embodiments.
Figure 17:
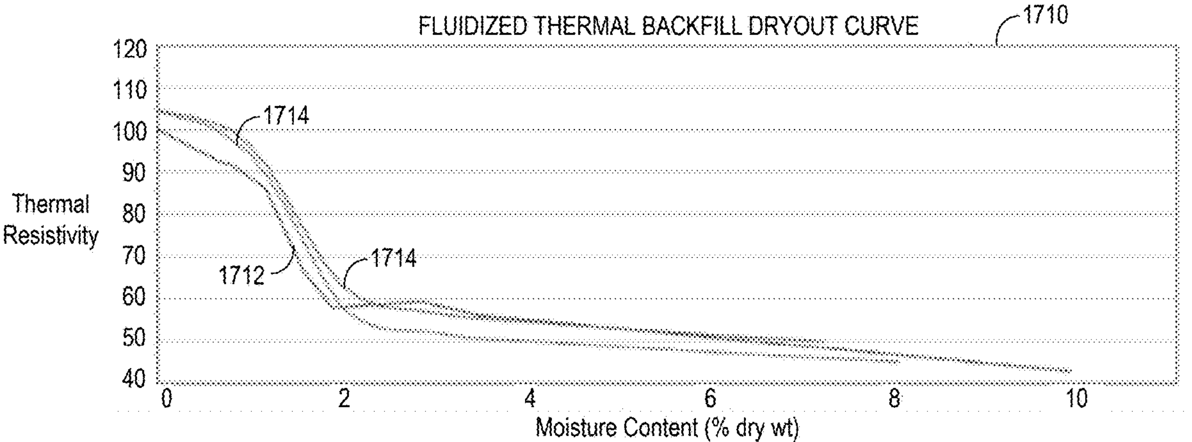

The vacuum dryout process has been found to have no noticeable effect on test results. Test results from the automated testing system were found to very closely match the results from other nationally accredited testing laboratories. Across multiple batches of various materials, results from the automated test system described herein were well within industry-accepted margins of error compared to other laboratories. FIGS. 16 and 17 are test results according to some embodiments. In particular, FIG. 16 includes a comparison graph 1610 for a 3000 PSI concrete drying curve created by embodiments described herein 1612 and a comparison laboratory 1614. A thermal dryout curve (also known as a Thermal Resistivity Dryout Curve ("TRDC")) is a graph that illustrates the relationship between a material's thermal resistivity and moisture content. It shows how well a material (like soil or concrete) can dissipate heat as it dries out. This may be important for engineering projects where heat management is essential, such as burying high-voltage power cables or designing geothermal systems. On the curve, "critical moisture content" may refer to a specific point where resistivity begins to increase rapidly as moisture decreases. Below this point, the material loses its ability to dissipate heat effectively (which can lead to cable overheating or failure). The X-axis represents moisture content (% dry weight reflecting the amount of water in the material, ranging from fully saturated to completely dry) and the Y-axis represents thermal resistivity (higher values mean the material is a better insulator and a poorer heat dissipator):

$$\frac{{}^{\circ}\mathrm{C} \times \mathrm{cm}}{\mathrm{W}}$$

The test values 1620 reflect that the thermal resistivity (° K*cm/W) test result difference was 2.63%, 5.69%, etc.

Similarly, FIG. 17 includes a comparison graph 1710 for a fluidized thermal back fill drying curve created by embodiments described herein 1712 and two tests by a comparison laboratory 1714. The test values 1620 reflect that the thermal resistivity (° K*cm/W) test result difference was 5.07%, 2.41%, etc.

Figure 18:
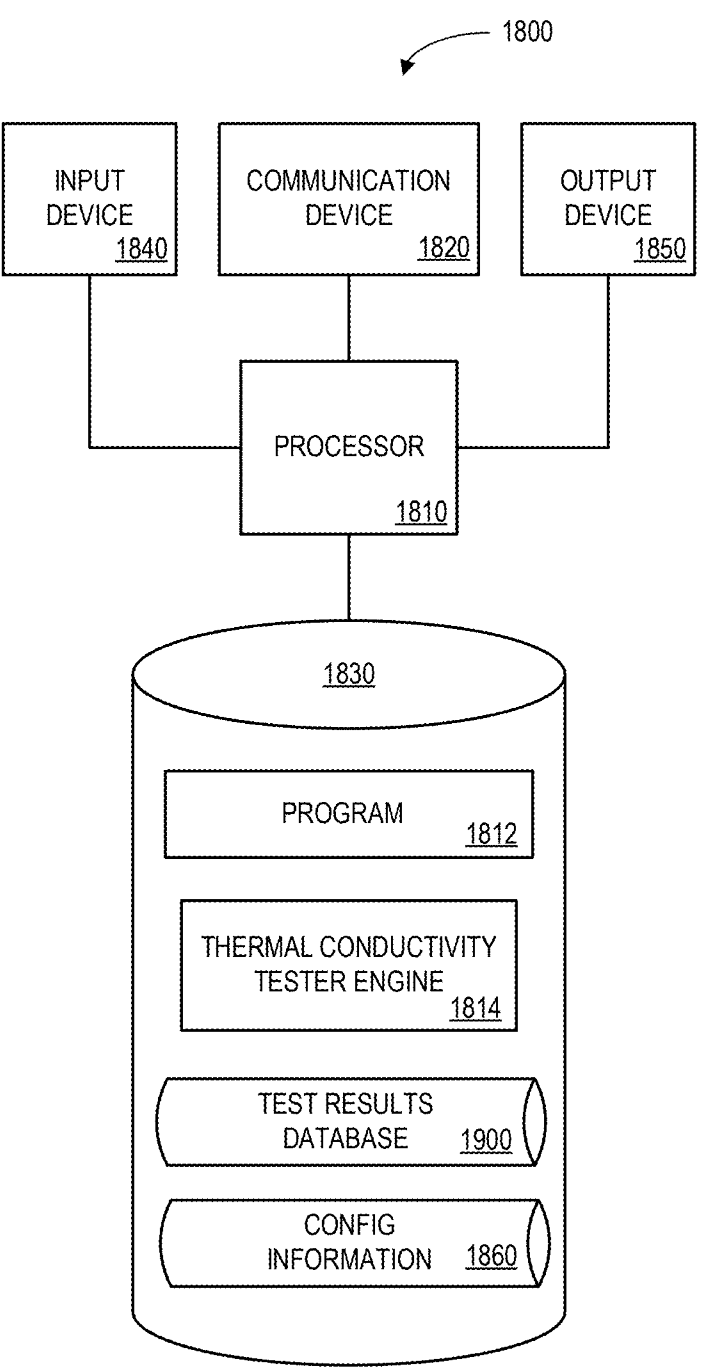
FIG. 18 is a platform or apparatus in accordance with some embodiments.

The embodiments described herein may be implemented using any number of different hardware configurations. For example, FIG. 18 illustrates a platform or apparatus 1800 that may be, for example, associated with the system 300 of FIG. 3 as well as the other systems described herein. The apparatus 1800 comprises a processor 1810, such as one or more commercially available Central Processing Units ("CPUs") in the form of one-chip microprocessors, coupled to a communication device 1820 configured to communicate via a communication network (not shown in FIG. 18). The communication device 1820 may be used to communicate, for example, with one or more analysis systems. The apparatus 1800 further includes an input device 1840 (e.g., a mouse and/or keyboard to define configuration parameters) and an output device 1850 (e.g., a computer monitor to display reports and analysis results).

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1812 and/or a thermal conductivity tester engine 1814 for controlling the processor 1810. The processor 1810 performs instructions of the programs 1812, 1814, and thereby operates in accordance with any of the embodiments described herein. For example, the processor 1810 may automatically and repeatedly dry the sample by varying the desaturation vacuum. The processor 1810 may also calculate a thermal resistivity based on heat input, temperature, and time data collected for different saturation levels.

The programs 1812, 1814 may be stored in a compressed, uncompiled and/or encrypted format. The programs 1812, 1814 may furthermore include other program elements, such as an operating system, a database management system, and/or device drivers used by the processor 1810 to interface with peripheral devices.

As used herein, information may be "received" by or "transmitted" to, for example: (i) the apparatus 1800 from another device; or (ii) a software application or module within the apparatus 1800 from another software application, module, or any other source.

In some embodiments (such as shown in FIG. 18), the storage device 1830 further stores a test results database 1900 and configuration information 1860. An example of a database that may be used in connection with the apparatus 1800 will now be described in detail with respect to FIG. 19. Note that the database described herein is only one example, and additional and/or different information may be stored therein. Moreover, various databases might be split or combined in accordance with any of the embodiments described herein.

Referring to FIG. 19, a table is shown that represents the test results database 1900 that may be stored at the apparatus 1800 according to some embodiments. The table may include, for example, entries identifying a drying curve for a material. The table may also define fields 1902, 1904, 1906, 1908, 1910 for each of the entries. The fields 1902, 1904, 1906, 1908, 1910 may, according to some embodiments, specify: a test identifier 1902, a project name 1904, a date and time 1906, moisture content 1908, and thermal resistivity 1910. The test results database 1900 may be created and updated, for example, based on information received from a test chamber and/or controller, a test administrator, when information is created, recorded, offloaded, etc.

The test identifier 1902 may be, for example, a unique alphanumeric code associated with a particular automated thermal conductivity test, the project name 1904 might indicate the material being tested, and the date and time 1906 may reflect when the measurement was taken. The moisture content 1908 may represent the amount of water in the material, ranging from fully saturated to completely dry. Higher values of the thermal resistivity 1910 may represent that the material is a better insulator and a poorer heat dissipator and, taken along with the moisture content 1908, define a dryout curve.

Thus, embodiments may provide improved systems and methods to facilitate thermal conductivity testing of a material. In particular, tests may be conducted more quickly as compared to traditional approaches and errors may be reduced. This might help, for example, prevent cable failure because underground power lines generate significant heat and the dryout curve to ensure that the surrounding soil can move the heat away even during dry seasons. Similarly, by knowing the "worst-case" resistivity (when the soil is dry), designers may choose an optimal right cable size and burial depth to avoid ampacity issues. Moreover, the dryout curve may help a designed choose the best backfill materials (such as fluidized thermal backfill or specific types of sand) that maintain low resistivity even at low moisture levels.

Although specific hardware and data configurations have been described herein, note that any number of other configurations may be provided in accordance with embodiments of the present invention (e.g., in other types of environments). Moreover, although some embodiments are focused on particular materials, any of the embodiments described herein could be applied to other types material. Further, embodiments might utilize any type of thermal analysis techniques, including Artificial Intelligence ("AI") techniques (e.g., to recognize unusual or problematic patterns that may be difficult for a human to detect). In addition, embodiments may focus on-such as by flagging potentially dangerous conditions in a dryout curve.

Figure 20:
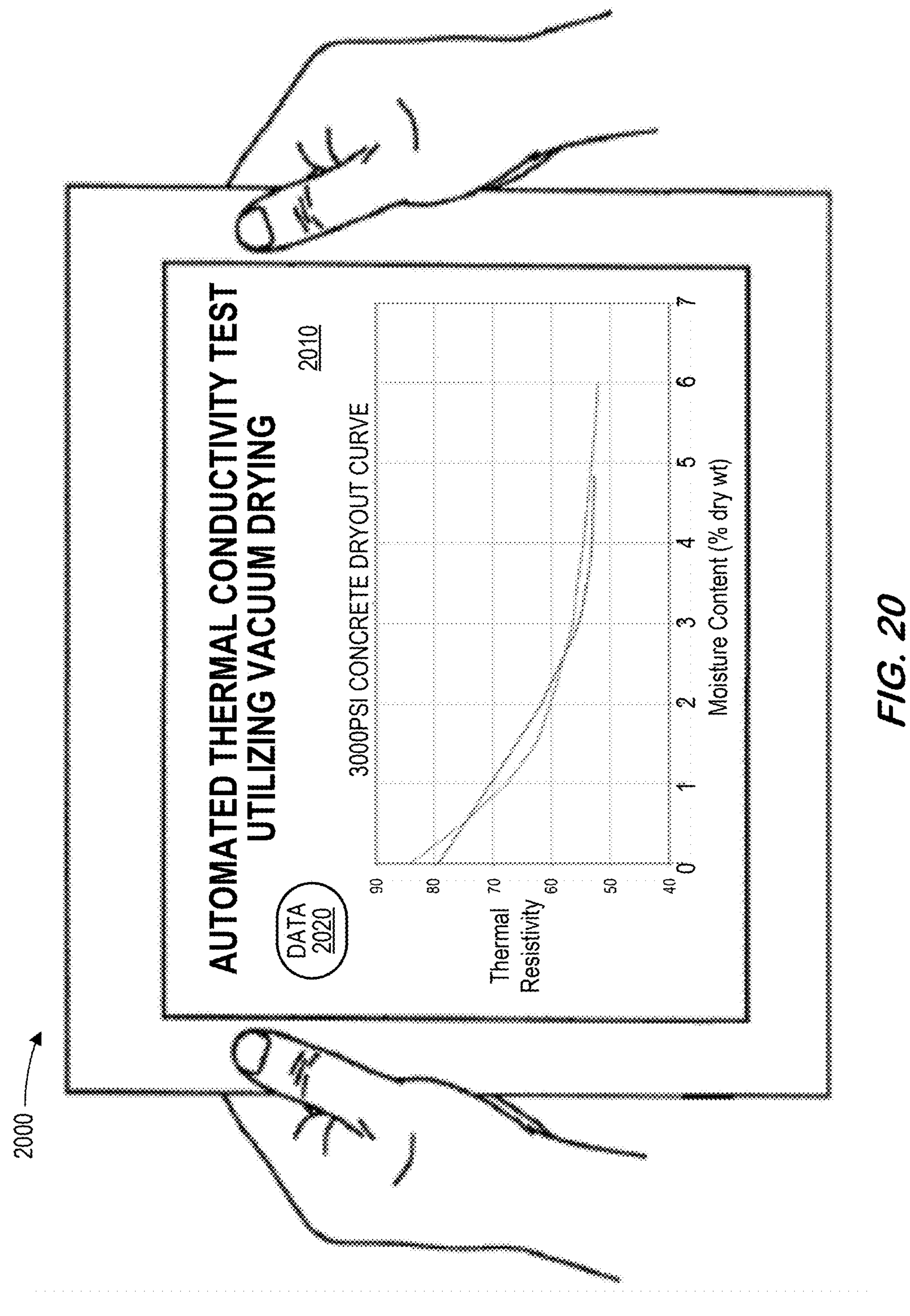
FIG. 20 is a handheld thermal conductivity test result display in accordance with some embodiments.

Note that the displays and devices illustrated herein are only provided as examples, and embodiments may be associated with any other types of user interfaces. For example, FIG. 20 illustrates a handheld tablet computer 2000 with an automated thermal conductivity test display 2010 according to some embodiments. The automated thermal conductivity test display 2010 shows a dryout curve that may be reviewed by a designer. The designer may also ask to see the test values that generated the curve (e.g., via a "DATA" icon 2020) to perform look for anomalies.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system, comprising:
- a test chamber, including:
  - an area to hold a sample of material, wherein the area is subject to a variable desaturation vacuum to dry the sample,
  - a precision scale to weigh the sample,
  - pistons to automatically raise the sample off of the precision scale and lower the sample back onto the precision scale between measurements, and
  - a probe inside the sample to provide heat and measure temperature;
- a controller to automatically and repeatedly dry the sample by varying the desaturation vacuum and calculate a thermal resistivity based on heat input, temperature, and time data collected for different saturation levels; and
- a test result data store containing electronic records, each record including thermal resistivity values over a range of moisture content values that represent a dryout curve for the material sample.

2. The system of claim 1, wherein the material is associated with at least one of: (i) concrete, (ii) thermal backfill, and (iii) sand.

3. The system of claim 1, further comprising an analog or a digital Pound per Square Inch ("PSI") pressure gauge.

4. The system of claim 1, further comprising a vacuum port/air intake with solenoid valves.

5. The system of claim 1, wherein the test chamber further includes electronics pass throughs.

6. The system of claim 1, further comprising at least one heat ring outside the sample to facilitate evaporation.

7. The system of claim 1, wherein the thermal resistivity calculation is associated with a temperature multiplied by a sample distance divided by a weight of the sample.

8. A method, comprising:
- placing a sample of material into an area of a test chamber, wherein the area is subject to a variable desaturation vacuum to dry the sample;
- weighing the sample with a precision scale in the test chamber;
- providing heat and measuring temperature using a probe inside the sample;
- automatically calculating thermal resistivity based on heat input, temperature, and time data;
- automatically removing moisture from the sample by varying desaturation vacuum;

monitoring internal temperature data using the probe and weight data using the precision scale;

automatically raising the sample off of the precision scale and lowering the sample back onto the precision scale between measurements using pistons;

automatically determining if the sample has achieved dryout; and if the sample has achieved dryout, storing results of calculation in a test result data store containing electronic records, each record including thermal resistivity values over range of moisture content values that represent a dryout curve.

9. The method of claim 8, further comprising:

also removing moisture from the sample by applying internal heat using the probe and external heat using a heat ring.

10. The method of claim 8, further comprising:

monitoring pressure using an automated sensor.

11. The method of claim 8, wherein the material is associated with at least one of: (i) concrete, (ii) thermal backfill, and (iii) sand.

12. The method of claim 8, wherein the thermal resistivity calculation is associated with a temperature multiplied by a sample distance divided by a weight of the sample.

13. The method of claim 8, further comprising:

creating the sample; and inserting the probe into the sample.

14. The method of claim 8, further comprising:

saturating the sample with water.

15. The method of claim 8, further comprising:

setting up a thermal properties analyzer.

16. The method of claim 8, further comprising:

retrieving test results from the test result data store; and creating the dryout curve.

17. The method of claim 8, wherein the test chamber is associated with an analog or a digital Pound per Square Inch ("PSI") pressure gauge, a vacuum port/air intake with solenoid valves, and electronics pass throughs.

* * * * *